United States Patent [19]

Nessel

[11] 3,930,654
[45] Jan. 6, 1976

[54] SOUND TRACK UNIT FOR AUDIO-VISUAL APPARATUS

[75] Inventor: Jiri M. Nessel, Palo Alto, Calif.

[73] Assignee: Victor Richards, San Francisco, Calif.

[22] Filed: Dec. 5, 1973

[21] Appl. No.: 421,986

[52] U.S. Cl................ 274/42 R; 360/133; 274/1 R
[51] Int. Cl.² ........................................ G11B 25/04
[58] Field of Search..... 353/19, 120; 274/1 R, 42 R; 360/133; 35/8 A

[56] References Cited
UNITED STATES PATENTS

| 3,062,552 | 11/1962 | Schwarz | 274/1 R |
|---|---|---|---|
| 3,416,150 | 12/1968 | Lindberg | 360/133 |
| 3,593,327 | 7/1971 | Shill | 360/133 |
| 3,706,857 | 12/1972 | Lynott | 360/133 |
| 3,818,986 | 6/1974 | O'Brien | 35/8 A |
| 3,829,207 | 8/1974 | Licitis | 353/120 |

Primary Examiner—Richard E. Aegerter
Assistant Examiner—A. J. Mirabito
Attorney, Agent, or Firm—Phillips, Moore, Weissenberger Lempio & Strabala

[57] ABSTRACT

A device for the viewing of photo-images and the presentation of sound recordings corresponding to such photo-images, which device may be controlled by the user to provide substantially random access to any photo-image and the sound recording corresponding thereto, is disclosed. A modular construction of such device and its adaptability to either hand-held or projection embodiments is described. A novel tone arm system as well as a novel turntable driving mechanism, a novel disc type record unit and a novel record changing mechanism is disclosed.

6 Claims, 10 Drawing Figures

FIG_6

FIG_7

FIG_8  FIG_9  FIG_10

SOUND TRACK UNIT FOR AUDIO-VISUAL APPARATUS

BACKGROUND OF THE INVENTION

This invention relates to audio apparatus for the reproduction of selected sound recordings from a plurality thereof included in a common sound track unit and more particularly to such an apparatus which may be used with audio visual apparatus adapted to enable the user to select any one of a group of photo-images for viewing or to sequentially view the photo-images of such group in any desired order with the audio production of a lecture or commentary relating to each photo-image being automatically selected from a corresponding group of sound recordings.

In order for audio-visual apparatus to be useful for instructional purposes, it is necessary that such apparatus be simple and convenient to operate, small, rugged and lightweight for portability, and inexpensive to manufacture and maintain.

It is an object of this invention to provide, for use in apparatus of the type described, disc type records for sound recording which are mounted in rugged units for storage and use.

SUMMARY OF THE INVENTION

The sound track unit for audio or audio-visual apparatus according to this invention comprises two circular disc-like members having sound recordings inscribed on the flat surfaces thereof and a hollow housing enclosing both of the disc-like members. The disc-like members are mounted within the housing for rotation about their respective axes which axes are parallel to and spaced from each other with the disc-like members overlapping each other in spaced planes. The means mounting the disc-like members within the housing includes thrust bearings which prevent movement of the disc-like members along their axes while permitting rotation of the disc-like members in their respective planes as well as limited movement of the axes thereof toward and away from each other. The disc-like members are rotated by means of a pair of hollow cylindrical drive members, each extending centrally through a different one of the disc-like members in coaxial alignment therewith. The internal surface of each of the hollow cylindrical drive members defines a pair of truncated right circular cones having their truncated apexes joined and their bases at opposite ends of the drive members. Four apertures are provided through the housing of sufficient size to each surround a different end of a different one of the pair of hollow cylindrical drive members throughout the limited movement of the axes of the disc-like members toward and away from each other. A bearing member is provided between the overlapping portions of the disc-like members to prevent contact between adjacent surfaces thereof and bearing members are provided on internal surfaces of the housing for contact with adjacent surfaces of the disc-like members during rotation thereof.

BRIEF DESCRIPTION OF THE DRAWING

The foregoing and other objects and features of the apparatus of this invention will be more fully appreciated when the following detailed description is read in conjunction with the drawing wherein.

DESCRIPTION OF THE PREFERRED EMBODIMENT

Figures 1, 2:
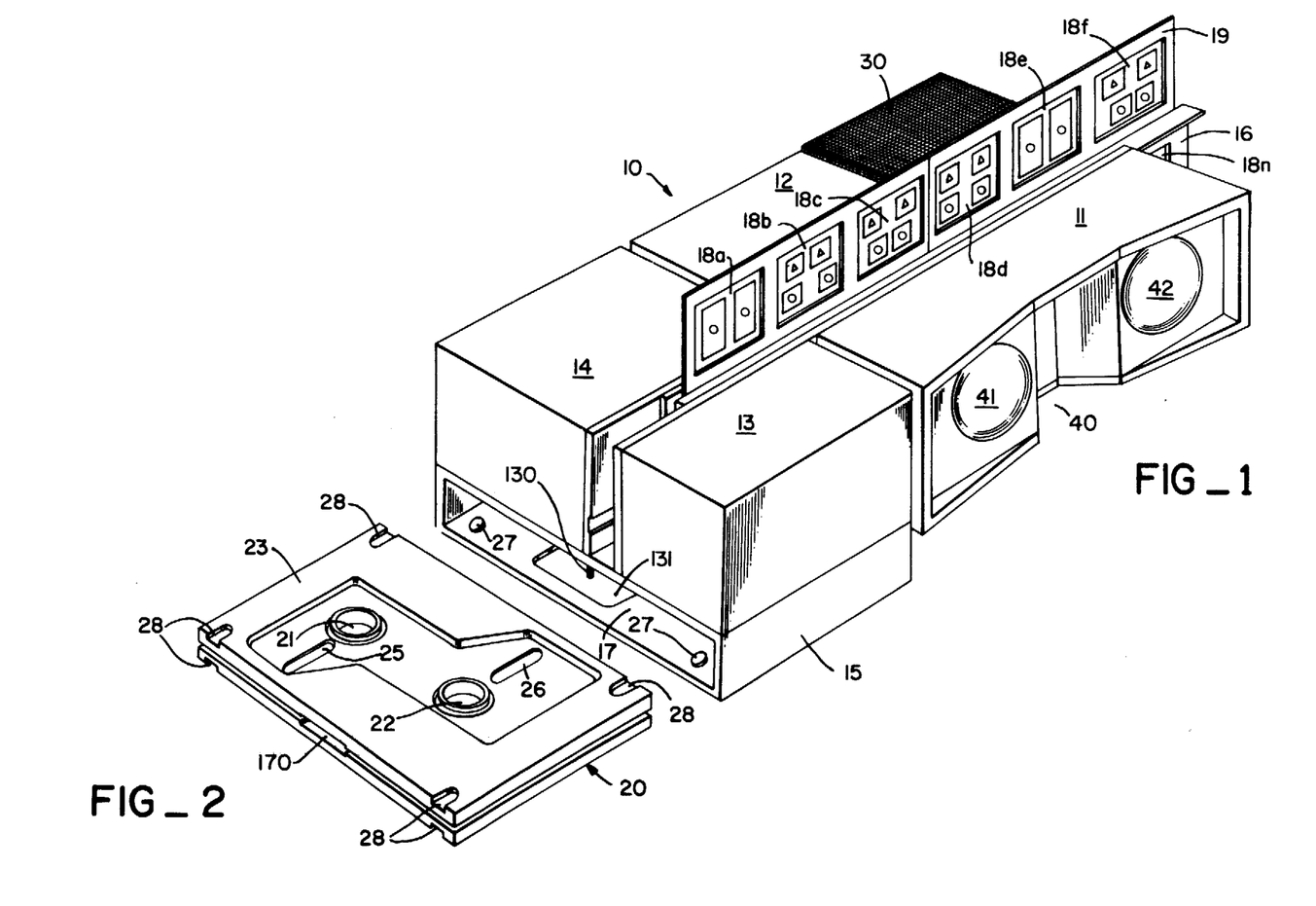
FIG. 1 is a perspective view of an embodiment of the apparatus of this invention with a plurality of photo-images positioned therein for use but with the disc type record unit containing the sound recordings removed therefrom.
FIG. 2 is a perspective view of a disc type record unit suitable for use in the embodiment of the apparatus of this invention shown in FIG. 1, represented in position to be inserted into the embodiment of the apparatus of this invention as shown in FIG. 1.

Referring to FIG. 1 a preferred embodiment of the apparatus of this invention in the form of a fully assembled hand-held device is shown. According to this embodiment of the invention the apparatus is constructed of a series of modules according to the various functions which the apparatus must perform which modules are assembled on a frame. Thus, as shown in FIG. 1 the device 10 according to this embodiment of the apparatus of this invention comprises an optical module 11, an audio amplifier and power supply module 12, a synchronization module 13 and a sound track drive module 14. All of the above modules are physically mounted on a frame unit 15 as will be more fully described hereinafter and which frame unit 15 includes the photo-image slide carriage unit 16 and the sound track unit receptacle 17.

As shown in FIG. 1 the various photo-images 18a–18n may be mounted in an appropriate frame 19, however, it is also contemplated that such photo-images could be formed on a single strip of film material suitable for insertion into the slide transport member 16. As shown in FIG. 1 the photo-images 18a–18n may be arranged in two rows extending the length of the slide transport member 16. Although there are six photo-images in each row as shown in FIG. 1, it will be understood that more or less photo-images may be used as desired. It will also be understood that the row of photo-images 18a through 18f are not in operative position as shown in FIG. 1, whereas the second row comprising photo-images from 18f through 18n are in operative position and thus hidden from view within the device 10.

Referring to FIG. 2 a sound track unit 20 is shown in position for insertion into the receptacle 17 of the device 10. In the sound track unit 20 according to this embodiment of the invention, as broadly shown in FIG. 2, the sound track is driven through a pair of apertures which are shown at 21 and 22. The sound track is recorded on a pair of apertured discs mounted for rotary movement independently of each other within a housing 23, for example, in which case a pair of elongated apertures 25 and 26 are provided through such housing and each associated with a different one of such discs to provide access for the pickup unit of a tone arm (not shown in FIG. 1) to the sound recordings on such discs.

As shown in FIGS. 1 and 2 the sound recordings on the disc associated with apertures 21 and 25 are correlated with the photo-images from 18f–18n and the sound recordings on the discs associated with apertures 22 and 26 are correlated with the photo-images 18a–18f. Thus, it will be understood that the orientation of both the slide 19 and the record unit 20 must be changed with respect to the device 10 in order to place the photo-images 18a–18f and the disc bearing the sound recordings correlated therewith, which disc is associated with apertures 22 and 26, into operative position. Such change in orientation is accomplished by removing the slide 19 and inverting it in the slide carriage member 16 and by removing the sound track unit 20 from the receptacle 17 and turning the unit 20 end-for-end for reinsertion to the receptacle 17. As shown in FIGS. 1 and 2 the sound track unit 20 may be held in receptacle 17 in any one of four orientations by the engagement of posts 27 at the entrance to the receptacle 17 with appropriate recesses 28 formed at the edges of both the upper and lower surfaces of the unit 20 as shown in FIG. 2.

Figures 3, 4, 5:
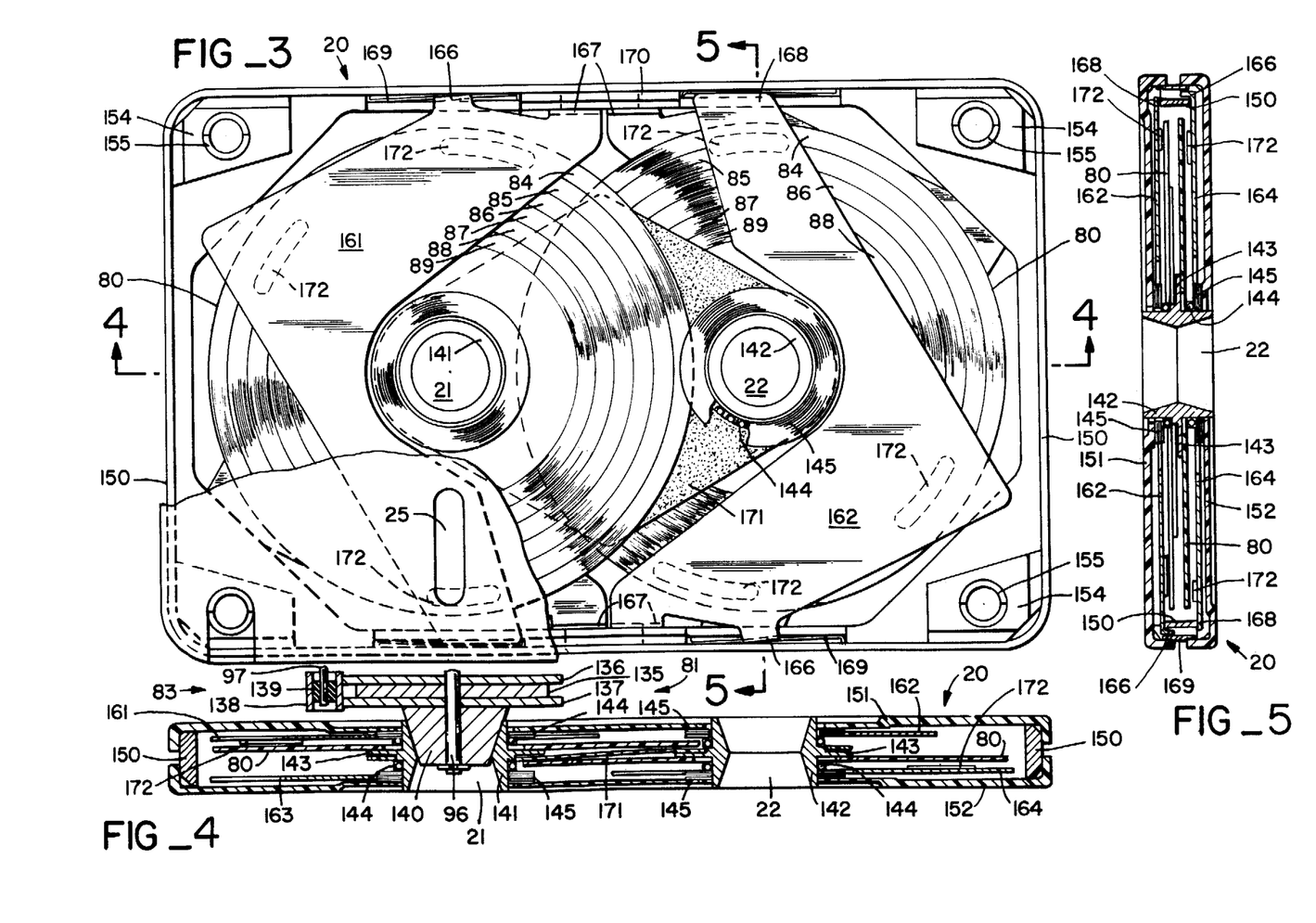
FIG. 3 is an enlarged top view of the disc-type record unit of FIG. 2 with the top cover thereof removed to expose the internal parts thereof.
FIG. 4 is a cross-sectional view taken along line 4—4 of FIG. 3 with the top cover thereof in place.
FIG. 5 is a cross-sectional view taken along lines 5—5 of FIG. 3 with the top cover thereof in place.

The most important control from the standpoint of the user is a microswitch associated with the loudspeaker grille 30. As most clearly shown in FIG. 1 the loudspeaker grille 30 provides the upper surface for the right end portion of the audio amplifier and power supply module 12. Thus, the fingers of the right hand of the user of the unit normally rest lightly on top of the loudspeaker grille 30 when the device 10 is hand-held for use. According to this embodiment of the invention a normally open microswitch is mechanically associated with the loudspeaker grille 30 such that a squeezing action of the right hand of the user will force the loudspeaker grille downwardly to close the microswitch. The closing of the microswitch will activate appropriate circuitry to move the photo-image slide in either direction depending upon the setting of a further control. The circuitry is such that a momentary squeezing action will be sufficient to move the photo-image slide through a complete cycle from one photo-image to the next photo-image without further action by the operator. The circuitry is also such that the exertion of continuous pressure on the loudspeaker grille 30 by the hand of the operator will result in continuous movement of the photo-image slide. divides the upper surface of the hollow box into forward and rear portions with the projecting portion of the plate 50 providing forward and rear surfaces for the mounting of the optical module 11 and the audio amplifier and power supply module 12, respectively. As indicated in FIG. 5 the synchronization module 13 is mounted on the forward portion of the upper surface of the hollow box and the sound track drive unit 14 (the internal parts of which are omitted in FIG. 5) is mounted on the rear portion of the upper surface of the hollow box.

As most clearly shown in FIG. 5 the photo-image slide transport mechanism 16 is supported between the optical module 11 and the plate 50 by means of a plate 63 as described hereinafter. According to this embodiment of the invention the photo-images are transparencies and thus a light source comprising a pair of incandescent light bulbs 51 is provided in the audio amplifier and power supply module 12 together with a translucent plate 52 which forms the forward wall of such module. The support plate 50 is, of course, provided with an aperture 53 in registry with the light source and the translucent plate 52 as well as the optical module 11.

The photo-image slide transport member 16 comprises an elongated frame having a row of apertures 54 therethrough corresponding to the photo-images to be presented for viewing. It will be understood that a slide including a plurality of photo-images arranged in a row will be inserted in a slot 55 provided in the frame of the transport member 16 bringing the photo-images into registry with the apertures 54 through the frame of the transport member 16.

Figure 6:
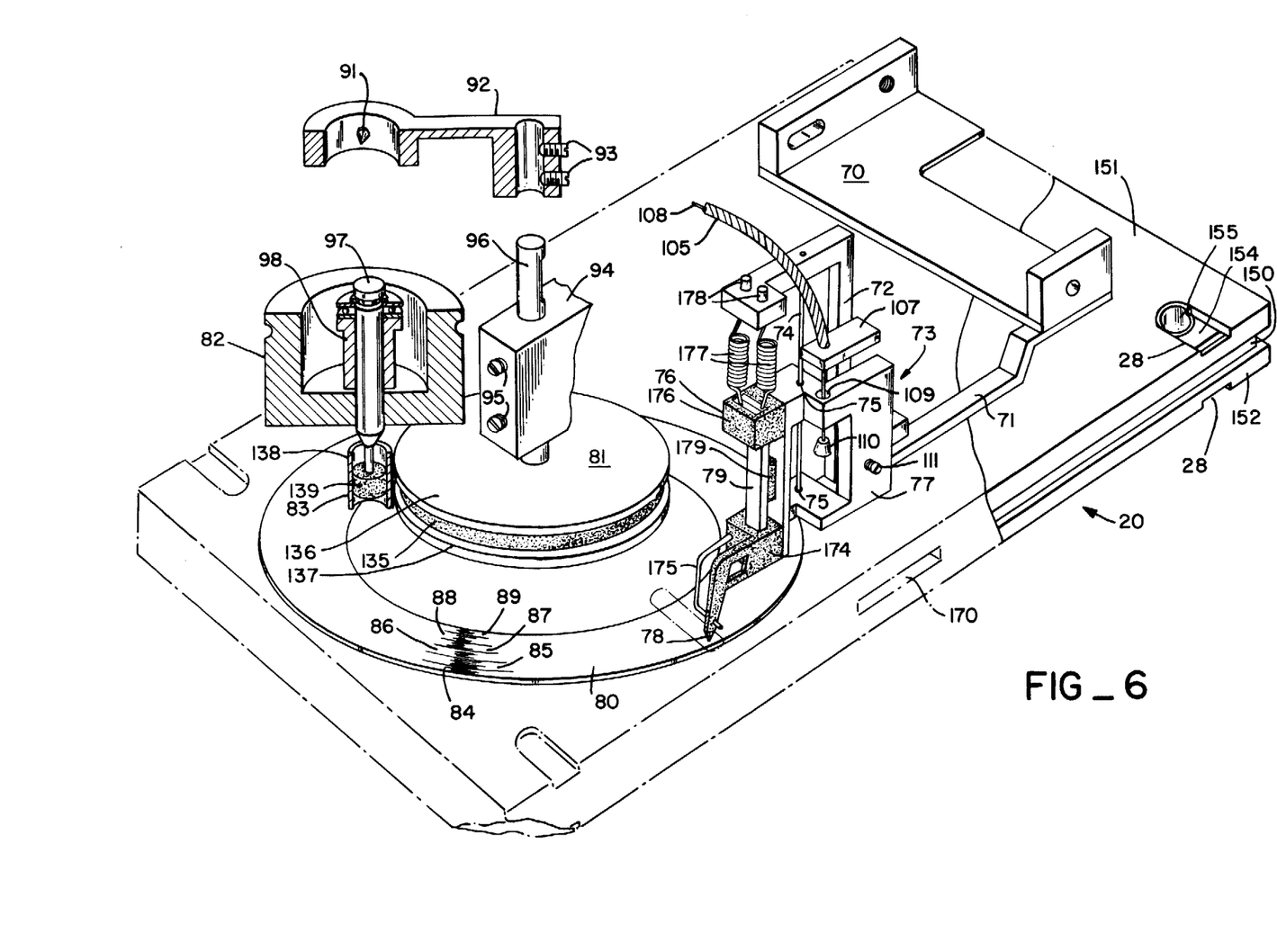
FIG. 6 is an enlarged fragmentary view of the tone arm assembly and the record driving assembly of the embodiment of the apparatus of this invention shown in FIG. 1 with a portion of the record driving assembly represented in exploded form and with a disc type record shown in operating position and the cover of the disc type record unit of FIG. 2 shown in dotted lines.

The transport member 16 is moved along between the forward face of the support plate 50 and the optical module 11 by means of a belt 56 and sprocket 57 arrangement. As shown in FIG. 5 the As shown in FIG. 6, a tone arm slide member 70 is shown in the upper right hand portion. The tone arm 71 comprises a rigid elongated member mounted at one end on the tone arm slide member 70. The free end of the tone arm 71 is provided with a rigid bracket member 72 providing a substantially U-shaped mounting structure for the pickup unit 73. A pivot member 74 extends between the legs of the U-shaped supporting structure formed by the tone arm 71 and bracket 72 through apertures 75 formed in the pickup unit 73 and dimensioned to allow the pickup unit 73 to pivot freely about the pivot member 74.

As shown in FIG. 6, the pickup unit 73 comprises a first leg 76 projecting from the pivot member 74 in the direction in which the tone arm 71 extends and a second leg 77 projecting in the opposite direction from the first projection and offset therefrom to provide a counterweight about the axis of the pivot member 74. The second leg 77 thus projects along the tone arm 71 toward the tone arm slide member 70 and has a sufficient extent to contact the tone arm or the bracket member 72 or both, thus limiting pivotal movement of the pickup unit about the pivot member 74 in a counterclockwise direction. However, the pickup unit 73 is free to pivot about the pivot member 74 in a clockwise direction.

A novel structure including a needle 78 mechanically coupled to a piezo-electric crystal 79 is mounted on the free end of the first leg 76 of the pivot member 74 of the pickup unit 73, as shown. This structure, which will be more fully described hereinafter, provides the actual interface between the audio recording 80 and the audio amplifier of module 12.

In order to provide a more complete understanding of the operation of the tone arm 71 and pickup unit 73 a sound track unit 20 is shown, partly, in phantom, in FIG. 6 in operative position with respect to such tone arm 71 and pickup unit 73. One of the record discs 80 which is contained in the sound track unit 20 is shown in full in FIG. 6 with the needle 78 of the pickup unit 73 in operative engagement therewith. Similarly, a magnetic friction drive structure 81 driven by a flywheel 82 and magnetic pinion 83 is shown in operative engagement with the disc 80.

It will be understood from FIG. 6 that the movement of the tone arm slide member 70 will tend to move the free end of the tone arm 71 and thus the needle 78 of the pickup unit 73 across the surface of the disc 80. Thus, when the needle 78 is raised from the upper surface of the disc 80 by means which will be more fully described hereinafter, movement of the tone arm slide member 70 will enable the needle 78 to be located at any particular point along a line extending radially from near the outer periphery of the disc 80 to a point adjacent the center of the disc 80.

According to this embodiment of the invention, a plurality of bands 84–89 of recorded material are provided on the upper surface of the disc 80, as shown in FIG. 6, each of such bands corresponding to one of the photo-images to be viewed in this embodiment of the apparatus of this invention. Thus, the movement of the tone arm slide member 70 is synchronized with the movement of the photo-image slide carriage unit 16 so that selection of a particular image for viewing will automatically select the one of the recorded bands 84–89 corresponding thereto.

Figure 7:
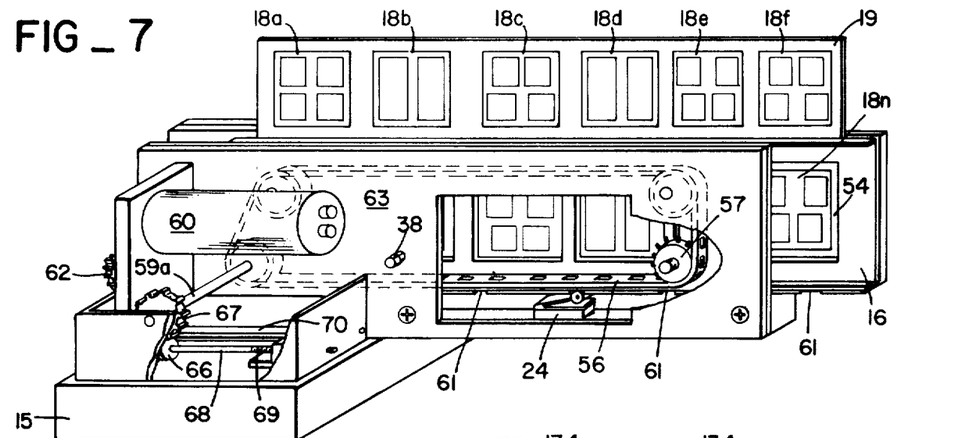
FIG. 7 is a front perspective view of the embodiment of the apparatus of this invention shown in FIG. 1 with portions removed or broken away to expose the cooperating mechanism for the tone arm assembly and the slide viewer assembly thereof.

Referring to FIG. 7, it will be seen that both the photo-image slide carriage unit 16 and the tone arm slide member 70 are driven by the motor 60 through the gear chain 62 which meshes with the gear 65 mounted on the axle 68. Thus, rotation of the axle 68 by the motor 60 through gear chain 62 and gear 65 will rotate the worm gear 66 which meshes with the gear 67 mounted on the axle 59a thereby imparting rotation to the axle 59a.

It will be seen that rotation of the axle 59a will rotate the one of sprocket wheels 57 mounted thereon which sprocket wheel 57 engages the belt 56 to thereby drive the belt 56 and the photo-image slide carriage unit 16 attached thereto by means of screw 58. Similarly, rotation of the axle 68 will rotate the threads 69 thereof which engage the threaded aperture of the tone arm slide member 70, so that the photo-image slide carriage unit 16 and the slide member 70 move in synchronism.

Referring to FIG. 7, it will be seen that a microswitch 24 is mounted on the frame 15 in operative contact with the lower edge of the photo-image slide carriage unit 16. It will also be seen that the lower edge of the photo-image slide carriage unit is provided with a plurality of notches adapted to operatively engage the microswitch 24. It will be understood that each of the notches 61 is associated with a different one of the apertures 54 in the photo-image slide carriage unit 16. According to this embodiment of the invention, the microswitch 24 is a single pole, double throw switch for reasons which will be more fully described hereinafter.

Figure 8:
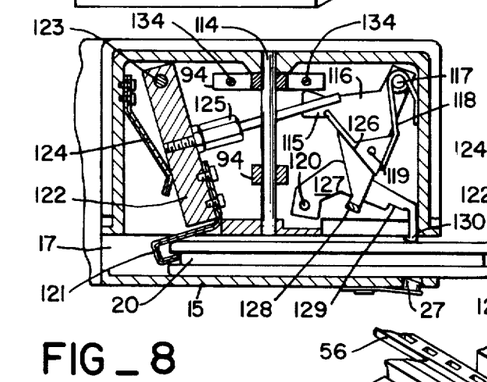
FIG. 8 is a fragmentary view, partially in cross-section and partially in elevation, of the record changing mechanism of the embodiment of the apparatus of this invention shown in FIG. 1 with the elements thereof in position immediately prior to the full insertion of the disc record unit of FIG. 2 therein, an end view of such disc record unit also appearing in FIG. 8.
Figure 9:
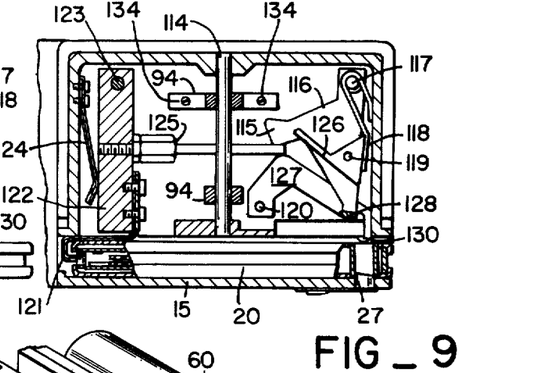
FIG. 9 is a view similar to FIG. 8 but showing the disc record unit fully inserted and the elements of the record changing mechanism in the position corresponding thereto.
Figure 10:
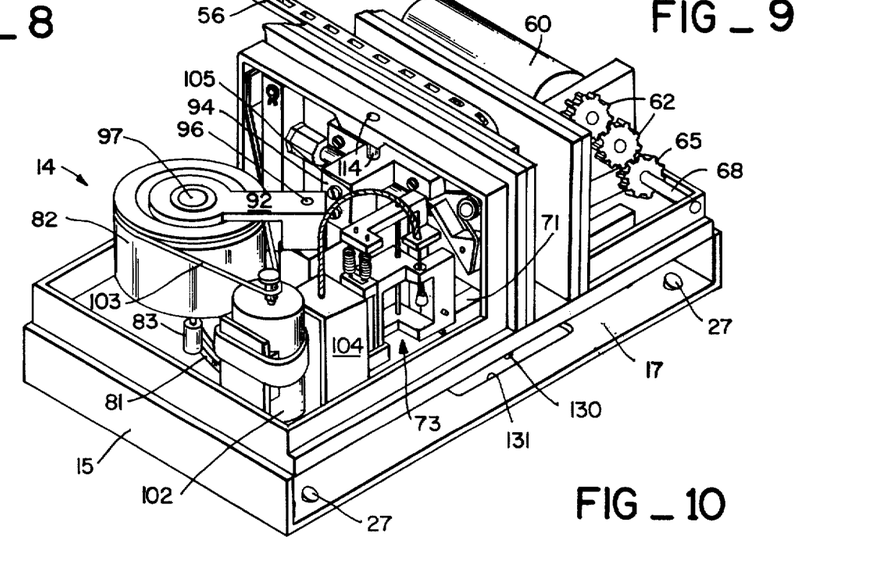
FIG. 10 is a fragmentary perspective view of the fully assembled record driving and tone arm module of the embodiment of the apparatus of this invention shown in FIG. 1 but with the cover removed to show the internal elements thereof.

FIGS. 8 and 9 show the mechanism for engaging and disengaging the sound track drive mechanism with the elements thereof in two different positions as will be explained more fully hereinafter. FIG. 10 is a perspective view of the sound track drive mechanism which will be more fully understood by considering FIGS. 6 and 10 together. The same reference numerals have been used in both FIGS. 6 and 10 to identify the same elements.

Thus, the flywheel 82 and pinion 83 are supported by means of an arm 92 (shown in exploded position in FIG. 6) with the magnetic pinion 83 in contact with the magnetic friction drive structure 81. The arm 92 and the magnetic friction drive structure 81 are both mounted on the sound track drive support slide 94 by means of a shaft 96. Referring to FIG. 6, it will be understood that the magnetic friction drive structure 81 is journalled on the end of the shaft 96 for rotation about the axis thereof. Similarly, it will be understood that the shaft 96 is fixedly held in the support slide 94 by means of set screws 95 and that the arm 92 is fixedly mounted on the extending end of the shaft 96 by means of set screws 93. The flywheel 82 and pinion 83 are provided with a common axle 97 which is journalled in a sleeve 98. The sleeve 98 is in turn rigidly mounted in an aperture in the arm 92 by means of set screws 91. Thus, it will be seen that the magnetic friction drive structure 81, flywheel 82 and pinion 83 may be raised and lowered as a unit by raising and lowering the support slide 94 as will be more fully described in connection with FIGS. 8 and 9.

As shown in FIG. 10, the flywheel 82 is driven by an electric motor 102 which is coupled to the flywheel 82 by means of a drive belt 103.

As also shown in FIG. 10, a solenoid 104 is mechanically coupled to the pickup unit 73 by means of a bowden wire or cable 105. The sheath 106 of the bowden cable is rigidly fixed between the housing of the solenoid 104 and a plate 107 carried by the bracket 74 of the pickup unit 73. The central wire 108 of the bowden cable 105 is attached at one end to the plunger of the solenoid 104 and the other end of the central wire 108 of the bowden cable 105 extends through an enlarged aperture 109 in the second leg 77 of the pickup unit 73. The axis of the aperture 109 is parallel to the axis of the aperture 75 through which the pivot member 74 is received. After passing through the aperture 109, the central wire 108 of the bowden cable 105 terminates in a plug member 110 which tapers from a diameter smaller than aperture 109 adjacent the second leg 77 to a diameter larger than aperture 109. Thus, when the solenoid 104 is energized, it will pull on the central wire 108 of the bowden cable 105 drawing the plug 110 into the aperture 109 and thus simultaneously raising the pickup unit 73 and causing it to pivot in a counterclockwise direction about the pivot member 74 until the set screw 111 in the second leg 77 of the pickup unit 73 contacts the bracket member 72 to limit such clockwise motion of the pickup unit 73.

Referring first to FIGS. 8 and 9, the sound track unit 20 is shown in the process of being inserted into the receptacle 17 in FIG. 8, and in FIG. 9 the sound track unit 20 is shown fully inserted in the receptacle 17 with the sound track drive mechanism operatively engaged therewith. The operative elements to be described hereinafter with respect to FIGS. 8 and 9 are mounted on the forward wall of the sound track drive module 14 as shown in FIG. 10. Thus, comparison of FIGS. 8 and 9 with FIG. 10 will be helpful although only a few of the reference numerals of FIGS. 8 and 9 are repeated in FIG. 10.

As shown in FIGS. 8 and 9 the drive mechanism support slide 94 comprises upper and lower legs mounted on a vertically extending shaft 114. The upper and lower ends of the shaft 114 are received in upper and lower flanges, respectively, of the housing for the sound track drive module 14, as shown. Thus, the support slide 94 is capable of movement up and down along the shaft 114 between the position shown in FIG. 8 when the upper leg of the support slide 94 is in contact with the upper flange of the module 14 and a position in which the upper leg of the support slide 94 is spaced from the upper flange of the module 14, as shown in FIG. 9. It will be understood, as explained hereinabove, that the magnetic friction drive structure 81 is carried up and down with the support slide 94, as is the flywheel 82 and pinion 83 carried by the arm 92 which is mounted on the support slide 94. Thus, when the support slide 94 is in the position shown in FIG. 8, the magnetic friction drive structure 81, flywheel 82 and pinion 83 are raised to disengage them from operative relationship with the sound track unit 20, and when the support slide 94 is in the position shown in FIG. 9 the magnetic friction drive structure 81, flywheel 82 and pinion 83 are in operative relationship with the sound track unit 20, as will be more fully described in connection with FIG. 12.

As can be seen in FIG. 10, the support slide 94 and magnetic friction drive structure 81, as well as the flywheel 82, pinion 83 and support arm 92 are all relatively massive. Thus, the weight of these elements is sufficient to urge the support slide 94 toward its lower position shown in FIG. 9 and insure effective engagement between the sound track drive mechanism and the sound track unit 20.

As shown in FIG. 8 the slide support member 94 is raised from its lower position by the engagement of the pawl 115 formed in the apex of the generally triangular pivot arm 116. As shown in FIG. 9 the base of the generally triangular pivot arm 116 extends generally vertically and the pivot arm 116 is mounted on a shaft 117 extending therethrough at the upper base angle thereof whereby the pivot arm 116 may be urged to pivot to the position shown in FIG. 8 by means of a coil spring 118 mounted on the shaft 117 with one end of the spring 118 bearing against a side flange of the module 14 and the other end of the coil spring 118 bearing on the pivot arm 116. It will be understood that the coil spring 118 must exert sufficient force on the pivot arm 116 to overcome the weight of the support slide 94 and the sound track drive mechanism mounted thereon, so that the support slide 94 will be maintained in the position shown in FIG. 8 when there is no sound track unit 20 in the receptacle 17.

When a sound track unit 20 is being inserted in the receptacle 17, as shown in FIG. 8, it will first engage a key hook 121 carried on the lower free end of an elongated pivot arm 122 which pivot arm 122 is mounted for pivotal movement about a shaft 123 extending therethrough at the upper end thereof. The pivot arm 122 is urged toward the position thereof shown in FIG. 8 by cantilever spring 124 having one end mounted on a side flange of the module 14 and the other end extending into contact with the pivot arm 122. When the sound track unit 20 is fully inserted in the receptacle 17 the pivot arm 122 will be moved to the position shown in FIG. 9 against the force of the spring 124 and the posts 27 at the entrance of the receptacle 17 will engage the recesses 28 in the housing 23 of the sound track unit 20 to hold the sound track unit 20 in the receptacle 17 against the force of the spring 124.

As will be more fully described hereinafter, the key hook 121 enters into an aperture in the sound track unit to open shutters which normally seal the tone arm apertures 25, 26 in the housing 23 of the sound track unit 20. Thus, the force exerted by the spring 124 not only tends to eject the sound track unit 20 from the receptacle 17 when the posts 27 are disengaged from the recesses 28, but also provides sufficient force for operation of the shutter mechanism of the sound track unit 20.

As shown in FIGS. 8 and 9 an elongated locking pin 125 projects from the pivot arm 122 toward the generally triangular pivot arm 116. The pivot arm 116 is provided with a one-way pivot pawl 126 which is mounted on the pivot arm 116 by means of a shaft 119. The pivot pawl 126 is adapted to pivot about the shaft 119 in a clockwise direction, but is restrained from pivoting about the shaft 119 in a counterclockwise direction. Thus, as shown in FIGS. 8 and 9, the spring 118 actually bears against the pivot pawl 126 of the pivot arm 116, thus, urging the pivot pawl 126 to rotate in a counterclockwise direction against its stop, and at the same time urging the pivot arm 116 toward the position shown in FIG. 8.

The pivot pawl 126 is provided with a projection of sufficient length to engage the free end of the locking pin 125 during an intermediate portion of the travel of such locking pin 125 from the position thereof shown in FIG. 8 to the position shown in FIG. 9. Thus, as the sound track unit 20 is inserted into the receptacle 17 pivoting the elongated pivot arm 122 about the shaft 123 against the force of spring 124, it causes the free end of the locking pin 125 to move downwardly engaging the projection on the pivot pawl 126 of the pivot arm 116. The locking pin 125 exerts a force on the projection of the pivot pawl 126 tending to force it to pivot in a counterclockwise direction. However, since the pivot pawl 126 is restrained from pivoting in a counterclockwise direction, such force is transmitted to pivot arm 116 causing it to rotate in a counterclockwise direction against the force of the spring 118 to the position thereof shown in FIG. 9. Such rotation of the pivot arm 116 removes the pawl 115 thereof from supporting relation with the lower side of the upper arm of the support slide 94, thus allowing the support slide 94 to move downwardly by the force of gravity to the position shown in FIG. 9.

A pivot arm 127 of inverted U-shape is mounted on a shaft 120 extending through the free end of one of its legs adjacent the lower base angle of the pivot arm 116, the pivot arm 116 being provided with a dog member 128 at its lower base angle which extends within the inverted U-shape of the pivot arm 127. It will be seen that the free end of the other leg of pivot arm 127 extends into the receptacle 17 and that a notch 129 for receiving the dog member 128 of the pivot arm 116 is provided in the pivot arm 127 adjacent such free end of the other leg member of the pivot arm 127.

Thus, when the locking pin 125 engages the pivot pawl 126 forcing the pivot arm 116 to rotate toward the position shown in FIG. 9, the dog member 128 on the pivot arm 116 will tend to raise the pivot arm 127 until the dog member 128 enters the notch 129.

The various members are dimensioned such that the engagement between the locking pin 125 and pivot pawl 126 will cease when the dog member 128 has entered the notch 125. Thus, the pivot arm 116 will be held in the position shown in FIG. 9 by the engagement of the dog member 128 of the pivot arm 116 with the notch 129 of the pivot arm 127. In this position the free end 130 of the other leg of the pivot arm 127 will project only slightly into the receptacle 17. Continued insertion of the sound track unit 20 into the receptacle 17 will rotate the pivot arm 122 and locking pin 125 to the position shown in FIG. 9 at which point the posts 27 engage the recesses 28 in the housing 23 of the sound unit 20, as described hereinabove.

As shown in FIG. 10, the bottom wall of the receptacle 17 is provided with an aperture 131 large enough to receive the fingers of the operator of the device. To release the sound track unit 20 from the receptacle 17 the operator pushes upwardly thereon through the aperture 131, thus simultaneously disengaging the posts 27 from the notches 28 and pushing upwardly on the free end 130 of the leg of the pivot arm 127 which projects into receptacle 17.

It will be seen that the pivot arm 127 will be caused to rotate in a counterclockwise direction when the sound track unit 20 is pushed upwardly in receptacle 17. Such rotation of the pivot arm 127 will cause the disengagement of the dog member 128 of pivot arm 116 from the notch 129 of the pivot arm 127. Disengagement of the dog member 128 from the notch 129 will allow the spring 118 to force the pivot arm 116 to rotate in a clockwise direction bringing the pawl 115 into engagement with the underside of the upper arm of the support slide member 94 thereby raising the support slide member to disengage the sound track drive mechanism from the sound track unit 20.

When the sound track drive mechanism has been disengaged from the sound track unit 20, the spring 124 will cause the pivot arm 122 to rotate in a counterclockwise direction and the key hook 121 carried at the free end of the pivot arm 122 will tend to eject the sound track unit 20 from the receptacle 17 causing the sound track unit 20 to project from the receptacle 17 a sufficient distance to be grasped by the hand as shown in FIG. 8. As the pivot arm 122 rotates in a counterclockwise direction, the free end of the locking pin 125 will be brought into contact with the lower inclined surface of the pivot pawl 126. Such engagement will rotate the pivot pawl 126 in a clockwise direction allowing the free end of the locking pin 125 to pass the pawl 126 and return to the position shown in FIG. 8.

In order to insure that the sound track mechanism carried by the slide member 94 is properly centered over the sound track unit 20 for engagement and disengagement thereof, the upper arm of the support slide 94 is provided with a pair of nylon screws 134. Such nylon screws 134 pass through the upper arm of the support slide 94 and into contact with the vertical end wall of the module 14 upon which the pivot arms 116, 122 and 127 are mounted. Thus, by proper adjustment of the screws 134 the support slide 94 may be rotated about the axis of the shaft 114 and rigidly held in a particular radially extending position by the abutment between the screws 134 and the end wall of the module 14. Since the screws 134 are made of nylon they will offer minimum resistance to the sliding movement of the support slide up and down along the shaft 114 due to their contact with such end wall.

Referring to FIGS. 3, 4 and 5, the engagement between the sound track drive mechanism and the sound track unit will be more fully understood. FIGS. 3, 4 and 5 show the structural details of the sound track unit 20 and FIG. 4 includes a cross-sectional view of the magnetic friction drive structure and magnetic pinion in operative engagement with the sound track unit 20.

As shown in FIGS. 4 and 5, the apertures 21 and 22 of the sound track drive unit 20 are each provided with a drive cylinder 141 and 142, respectively. According to this embodiment of the invention, the inner surface of each of such drive cylinders 141 and 142 form a pair of truncated right circular cones having their truncated apexes joined and their bases at opposite ends of the cylinder. The dimensions of the internal surfaces of the drive cylinders 141 and 142 and the external dimensions of the drive cone 140 are selected to enable the drive cone 140 to enter the drive cylinders 141 and 142 from either end thereof and engage such internal surface as shown in FIG. 4. Thus, it will be seen that rotation of the magnetic friction drive structure 81 about the axis of the shaft 96 will also tend to impart rotation to the drive cylinder 141 due to the contact between the conical exterior surface of the driving cone 140, and the conical interior surface of the drive cylinder 141.

As best shown in FIG. 3, the sound track is recorded on a pair of record discs 80, each of which is mounted on a different one of the drive cylinders 141 and 142. The drive cylinders 141 and 142, each of which carries a disc 80, are mounted for rotation within the sound track unit 20, as will now be described.

As best shown in FIGS. 3 and 3, the sound track unit 20 comprises a rigid frame 150 in the form of a hollow open-ended rectangular box. Flanged cover members 151 and 152, each of which is provided with apertures 21 and 22 for receiving the driving cone 140 as well as apertures 25 and 26 for receiving the needle 78 of the pickup unit 73, close the open ends of the box formed by the frame 150 with the record discs 80 and drive cylinders 141 and 142 sandwiched therebetween.

As best shown in FIGS. 6 and 3, the four corners of the frame 150 are provided with a reinforcing structure 154, each of which includes an eyelet 155. The eyelet 155 provides a convenient method for attaching the covers 151 and 152 to the frame 150 after the unit 20 has been fully assembled. The eyelet 155 also cooperates with the grooves 28 formed in the edges of the covers 151 and 152 to provide a socket for the posts 27 of the receptacle 17 in holding the unit 20 in the receptacle 17.

As best shown in FIGS. 4 and 5, each of the drive cylinders 141 and 142 is provided with a flange 143 which serves both as the means of mounting a record 80 on such drive cylinder and as the means of mounting the drive cylinders 141 and 142 between the covers 151 and 152. It will be seen that such flange 143 is displaced slightly toward one end of the cylinders 141 and 142. Thus, by inverting the cylinders with respect to each other, the records 80 mounted on the flanges 143 of the respective cylinders will be positioned at different levels within the unit 20 so that such records 80 may overlap each other, as best shown in FIG. 3. The flanges 143 of the drive cylinders 141 and 142 may be sandwiched between ball bearings 144, which are in turn sandwiched between appropriate shims 145, which abut the adjacent inner surfaces of the cover members 151 and 152.

Also sandwiched between the covers 151 and 152 and mounted on the frame 150 are four shutter members 161, 162, 163 and 164. A first pair of shutter members 161, 163 are located on opposite sides of the record disc 80 associated with the driving cylinder 141 and a second pair of shutter members 162 and 164 are located on opposite sides of the record disc 80 associated with driving cylinder 142.

It will be understood that the record discs 80 have recording grooves formed on both of their surfaces in bands 84–89, as described hereinabove. Thus, each of the shutters 161 and 163 are associated with an aperture 25 through a different one of the cover plates 151 and 152 which provides access to one of the sides of the disc 80 associated with the drive cylinder 141. Similarly, each of the shutter members 162 and 164 are associated with one of the apertures 26, which provides access to one of the sides of the record disc 80 associated with the driving cylinder 142.

As best shown in FIG. 3, the shutters 161–164 extend across the width of the sound track unit 20 and are relieved at their center to accommodate the driving cylinders 141 and 142, ball bearings 144, and shims 145. One end of each shutter 161–164 is provided with a pair of down-turned flanges 166 and 167. As best shown in FIG. 5, one of the flanges 166 is received over the sidewall of the frame 150 and the other end 168 of the shutter rests on top of the sidewall of the frame member 150. The downwardly extending flange 166 is compressively held against the frame member 150 by a spring member 169 mounted between flanges on the cover members 151 and 152. The flanges 167 on shutter members 161 and 164 are located adjacent each other inside the frame member 150 and opposite an aperture 170 which extends through the sidewall of the frame member 150. Such aperture 170 is best shown in FIGS. 2, 6 and 9.

Referring specifically to FIG. 9, it will be seen that when the sound track unit 20 is inserted into the receptacle 17, the key hook 121 mounted on the end of the pivot member 122 will enter the aperture 170 through the sidewall of the frame 150 which is presented to it. Entry of the key hook 121 into the aperture 170 will bring it into abutment with the flanges 167 on either shutters 161 and 164 or 162 and 163 depending upon the orientation of the sound track unit 20. Due to such abutment, the two shutter members involved will be caused to pivot about the flange 166 in opposition to the spring 169, thus causing the opposite end 168 of the shutter members to slide along the top of the frame 150 toward opposite ends thereof. Such movement of the shutter members will clear the apertures 25 on opposite sides of the sound track unit 20 thereby providing access through upper one of such apertures for the needle 78 of the pickup unit 73 to contact the surface of one of the record discs 80. It will be understood that the other two apertures 26 will remain closed. The purpose of this arrangement is, of course, to exclude dust and dirt from the interior of the sound track unit 20 when it is not in use. Thus, the spring 169 biases the shutter members 161-164 toward their closed position, except when the key hook member 121 is in compressive contact with the flanges 167.

It should be pointed out that a strip 171 made of a fluorocarbon resin providing low surface friction, such as that sold under the trademark "TEFLON", is interposed between the overlapping portions of the record discs 80 in order to avoid abrasive contact therebetween when the unit is in operation. Similarly, "TEFLON" pads 172 are provided on the surfaces of the shutter members 161-164 adjacent to record discs 80. Such "TEFLON" pads prevent abrasive damage to the recorded surfaces on the record discs 80 if they should be brought into contact with the shutter members 161-164 in operation. The "TEFLON" strip 171 and the "TEFLON" pads 172 also reduce any frictional drag that might otherwise result from contact between the record discs 80 themselves or between the record discs 80 and the shutter members 161-164.

It should be pointed out that according to the preferred embodiment of this invention, the dimensions of the device 10 are selected so that two slides 19 each including two rows of six photo-images 18 are associated with a sound track unit 20 capable of providing a total of about two hours of audio output and having dimensions approximately equal to the dimensions of one of such slides 19 when folded in half transversely. Thus, twenty four photo-images are associated with a sound track unit 20, each row of six photo-images being associated with a different one of the four possible orientations of the sound track unit, and about five minutes of audio output being available for each photo-image. The slides 19 may be folded in half and placed with the sound track unit 20 for convenient storage in a common container. Appropriate indicia may be provided on the slides 19 and sound track unit 20 to facilitate proper correlation between each row of photo-images and the corresponding orientation of the sound track unit in inserting them into the device 10.

What is claimed is:

1. A sound track unit for audio apparatus comprising:
   a. two centrally apertured circular disc-like members having sound recordings inscribed on the flat surfaces thereof;
   b. a hollow housing enclosing both of said two disc-like members;
   c. means mounting said disc-like members within said housing for rotation about their respective axes, said axes of said disc-like members being parallel to and spaced from each other with said disc-like members overlapping each other in planes spaced axially thereof, said mounting means including thrust bearings preventing movement of said disc-like members along said axes thereof while permitting rotation of said disc-like members in their respective planes as well as limited movement of said axes thereof toward and away from each other; and
   d. means for rotating said disc-like members including a pair of hollow cylindrical drive members each extending through the central aperture of a different one of said two disc-like members and mechanically connected thereto in coaxial alignment therewith, the internal surface of each of said hollow cylindrical drive members defining a pair of truncated right circular cones having their truncated apexes joined and their bases at opposite ends of said drive members, and four apertures through said housing each of said apertures surrounding a different end of a different one of said pair of hollow cylindrical drive members throughout said limited movement of said axes of said disc-like members toward and away from each other.

2. A sound track unit for audio apparatus as claimed in claim 1 wherein a strip of material providing low surface friction is interposed between the overlapping surfaces of said two disc-like members.

3. A sound track unit for audio apparatus as claimed in claim 1 wherein pads made of a fluorocarbon resin providing low surface friction are mounted on interior surfaces of said housing adjacent non-overlapping surfaces of said two disc-like members.

4. A sound track unit for audio apparatus as claimed in claim 1 wherein each of said pair of hollow cylindrical drive members includes a circular flange projecting from its exterior surface centrally thereof and said thrust bearings comprise ball bearing structures on opposite sides of each of said circular flanges.

5. A sound track unit for audio apparatus as claimed in claim 1 wherein said hollow housing has four elongated rectilinear slots therein each associated with a different side of a different one of said two disc-like members and extending radially thereof.

6. A sound track unit for audio apparatus as claimed in claim 5 wherein said hollow housing comprises a rigid frame in the form of a hollow open-ended rectangular box and a pair of flanged cover members each of which is provided with two of said four apertures of said means for rotating said disc-like members and two of said four elongated rectilinear apertures, said cover members closing the open ends of the hollow box formed by said frame with said disc-like members sandwiched therebetween.

* * * * *